J. E. GOODHUE.
CORN HUSKING MACHINE.
APPLICATION FILED MAR. 24, 1909.
944,088.
Patented Dec. 21, 1909.
4 SHEETS—SHEET 1.
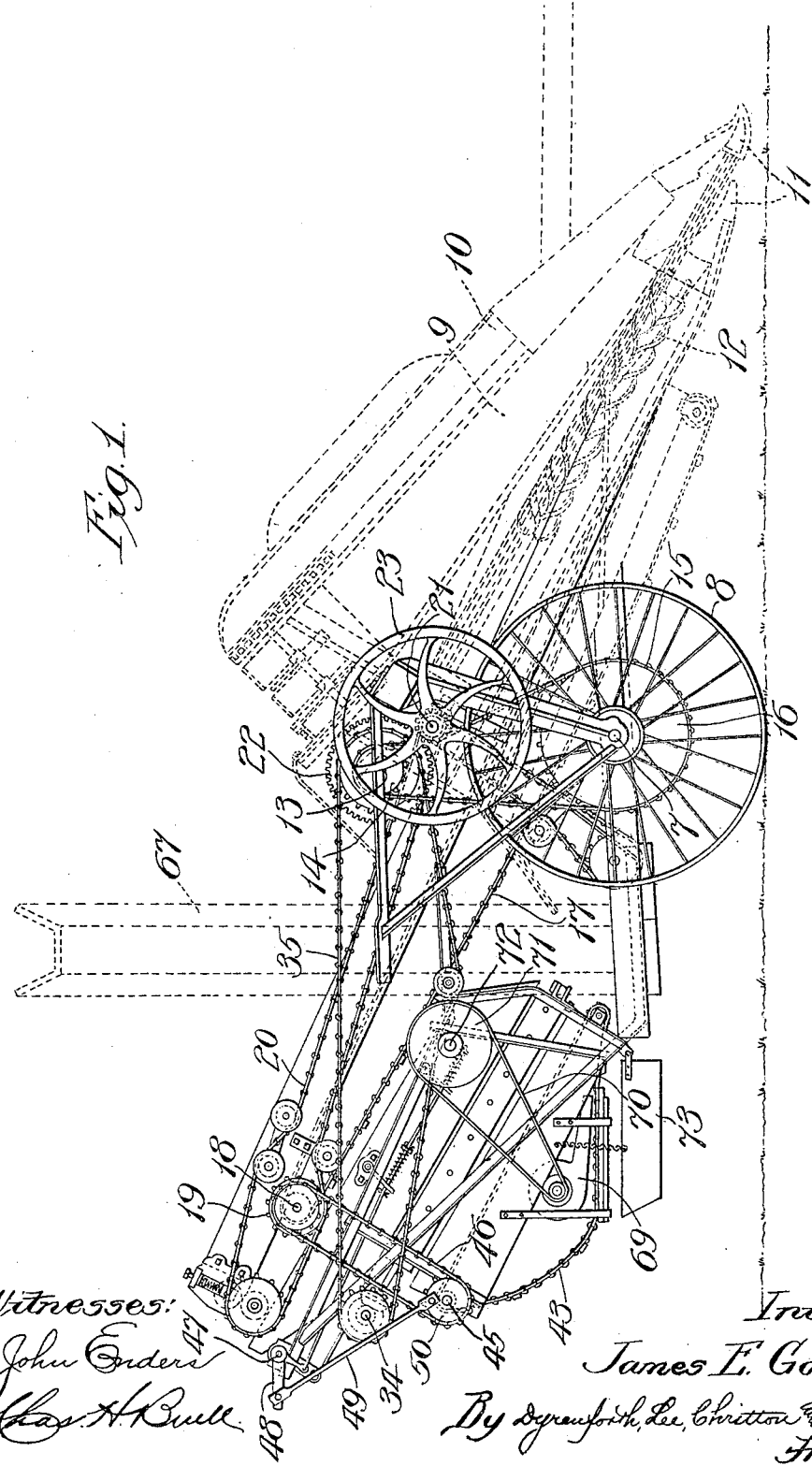

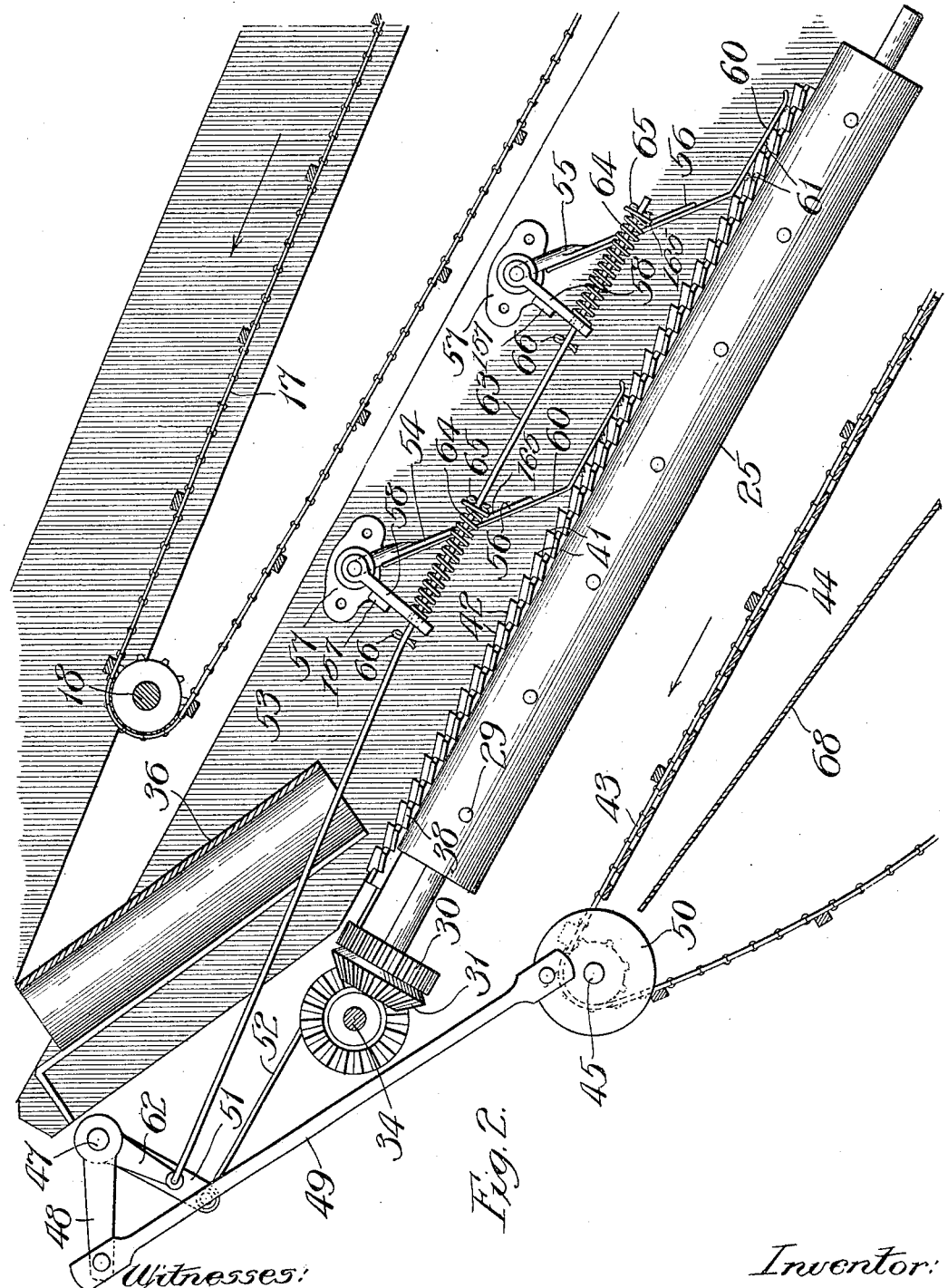

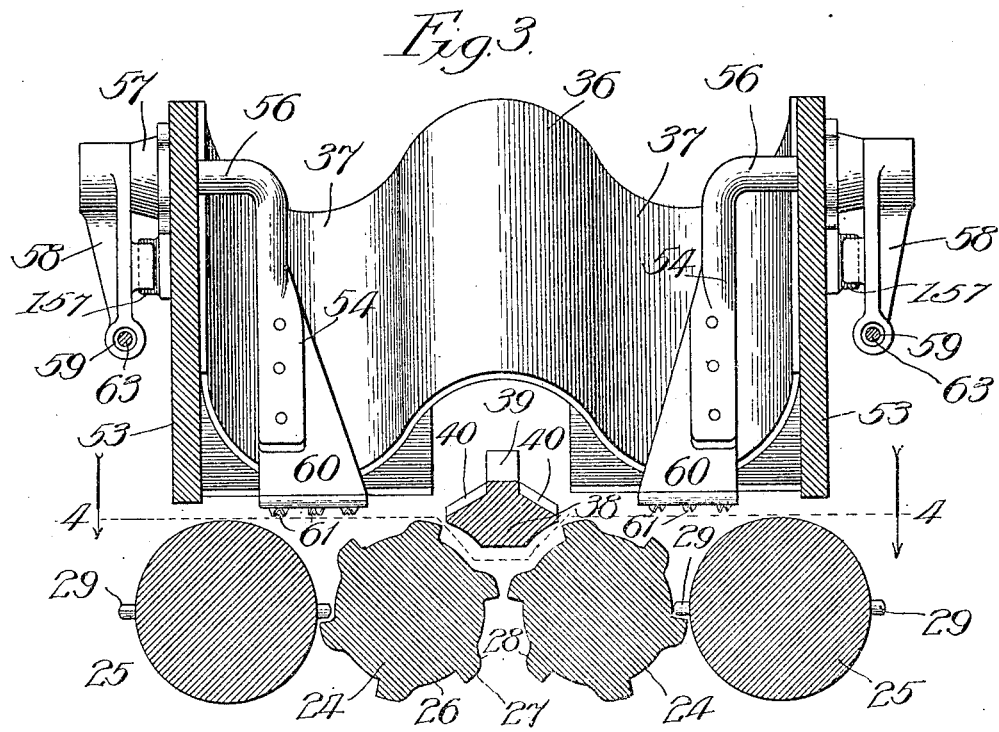
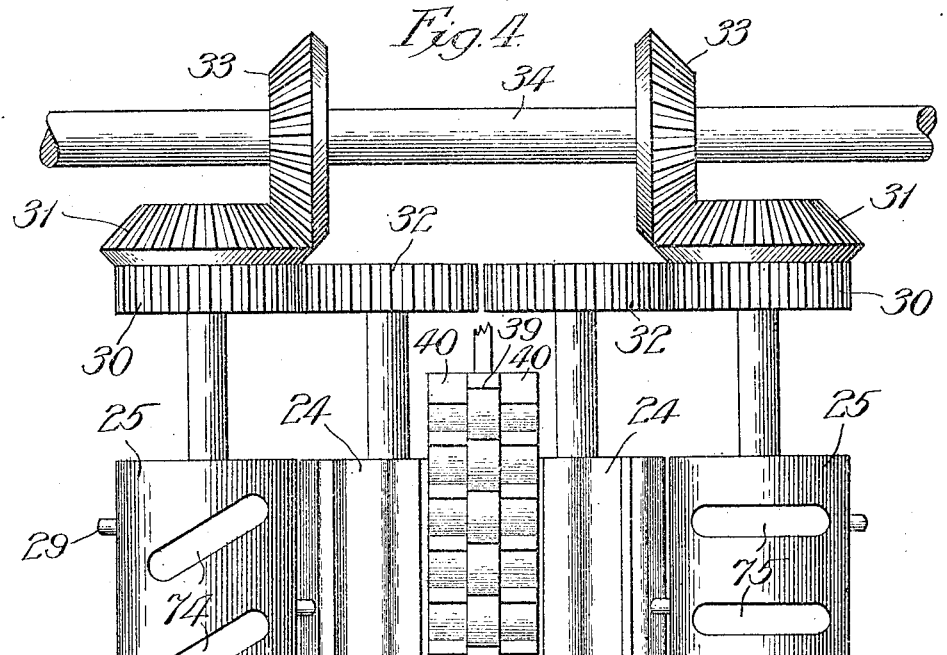

J. E. GOODHUE.
CORN HUSKING MACHINE.
APPLICATION FILED MAR. 24, 1909.
944,088.
Patented Dec. 21, 1909.
4 SHEETS—SHEET 4.
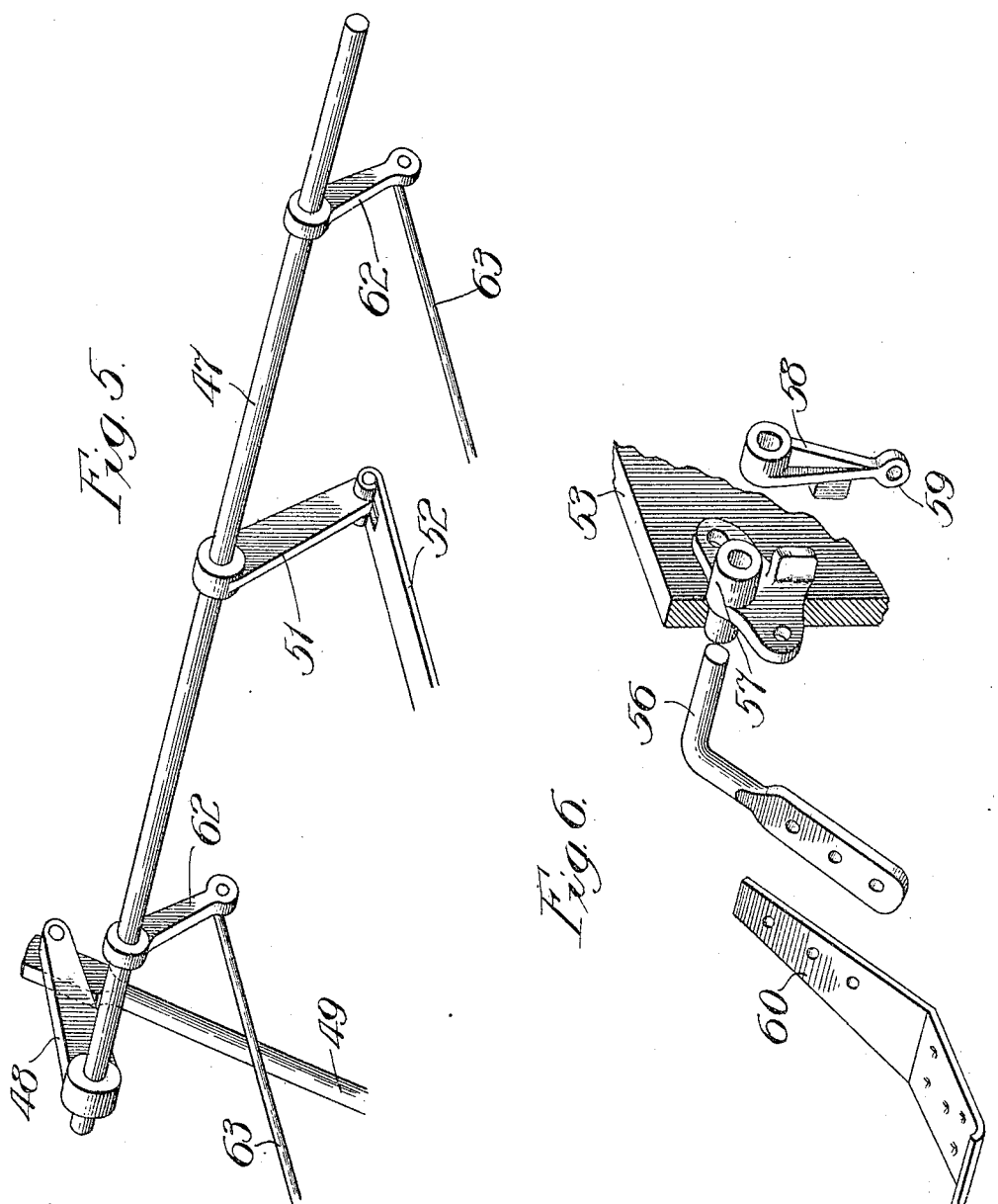
Witnesses:
John Enders
Chas. H. Buell
Inventor:
James E. Goodhue.
By Dyrenforth, Lee, Chritton & Wiles
Attys.

UNITED STATES PATENT OFFICE.

JAMES E. GOODHUE, OF ST. CHARLES, ILLINOIS.

CORN-HUSKING MACHINE.

944,088.                    Specification of Letters Patent.    Patented Dec. 21, 1909.

Application filed March 24, 1909. Serial No. 485,473.

*To all whom it may concern:*

Be it known that I, JAMES E. GOODHUE, a citizen of the United States, residing at St. Charles, in the county of Kane and State of Illinois, have invented a new and useful Improvement in Corn-Husking Machines, of which the following is a specification.

My invention relates to improvement in corn-husking mechanism generally and more especially to such mechanism forming an integral part of a machine for gathering ears of corn from stalks left standing in the field.

My object is to provide certain improvements in husking devices of the type shown and described, for example, in Letters Patent No. 762,523, granted to me June 14, 1904, for the purpose of simplifying the construction and rendering the operation thereof more perfect, as well as adapting the mechanism for consolidation and coöperation with a corn-harvester of the type and general construction shown and described in Letters Patent No. 788,205, granted to me April 25, 1905.

In the drawings—Figure 1 is a combined corn-harvesting and husking machine, the mechanism more directly involved in my present improvements being shown in full lines; Fig. 2, an enlarged, broken, conventional and partly sectional view of the husking portion of the machine; Fig. 3, an enlarged cross-section through the husking mechanism; Fig. 4, a broken plan view taken on irregular lines 4—4 in Fig. 3; and Figs. 5 and 6, broken perspective detail views of parts entering into the construction of the husking mechanism.

The main frame carrying all the harvesting and husking mechanism is journaled and suitably balanced upon the axle 7 of the traction-wheels 8. Forming a part of the frame are the usual forward-extending wings 9 and 10 shod with pick-up points 11 and serving to guide standing corn-stalks into the bite of forwardly-inclined snapping-rollers 12.

The snapping-rollers may be constructed like, and operate the same as, those shown and described in my aforesaid patent No. 788,205. The main driving cross-shaft 13 of the machine carries sprocket-pinions 14 driven by chains 15 from sprocket-wheels 16 carried by the traction-wheels 8. The ears of corn snapped from the stalks by the rollers 12 drop, in the present construction, upon an endless slatted conveyer-belt 17 running at its upper end around the propelling shaft 18. The shaft 18 is rotated by a sprocket thereon 19 engaging a traveling chain 20 driven from a sprocket on the fly-wheel shaft 21. It is to be understood that the fly-wheel shaft is geared to a gear-wheel 22 on the main shaft 13 and carries the usual fly-wheel 23. Mounted in the frame beneath the conveyer-belt 17 are two pairs of husking-rollers 24, 25, each roller 24 being formed with longitudinally-extending grooves or recesses 26 between longitudinally-extending teeth 27 presenting cam-surfaces 28 at their forward sides. The rollers 24 may be of approximately the same construction as those for the same purpose shown and described in Letters Patent No. 683,174, granted to me September 24, 1901. The rollers 25 are provided at diametrically opposite sides with short pins 29 adapted to mesh with grooves 26 of the companion-rollers 24. The shafts of the rollers 25 carry pinions 30 and bevel-pinions 31. The pinions 30 mesh with pinions 32 on the shafts of the companion-rollers 24 and the bevel-pinions 31 mesh with the bevel-pinions 33 on a cross-shaft 34 which is driven by a sprocket-chain 35 from the shaft 13.

Mounted in the frame beyond the shaft 18 of the conveyer 17 is a forwardly inclined plate 36 forming ear straightening and distributing chutes 37, 37, terminating respectively just over the upper end portions of the inclined husking-rollers. The chute device tends to distribute the ears to the two pairs of husking rollers and straighten them out so that they will extend longitudinally as they pass on to the rollers. Between the upper sides of the rollers 24 and extending parallel therewith is a longitudinally-reciprocating ear-engaging and straightening bar 38 having a central upwardly-extending serrated rib 39 and laterally-inclined serrated faces 40. The teeth on the parts 39, 40, have abrupt forward edges 41 and inclined top or rear edges 42, as indicated in Fig. 2. Extending beneath the husking-rollers is a slatted chain conveyer 43 riding on an inclined slotted platform 44 and driven from a shaft 45 which in turn is driven by a chain 46 from the shaft 18.

Mounted in the frame beyond the plate 36 is a rock-shaft 47 having a crank 48 at one end oscillated by means of a pitman 49 eccentrically connected with a disk 50 on one end of the shaft 45. The shaft 47 has a central crank 51 to which is pivotally secured a link 52 connected with the upper end of the ear-straightening bar 38. The plate 36 is secured between longitudinally-extending and forwardly-inclined upright side-boards 53 extending at their lower edges over and parallel with the rollers 25 at opposite sides of the conveyer 17. Mounted on each of the side-boards 53 is a pair of upper ear-engaging presser-devices 54 and lower presser devices 55, each comprising a crank-arm 56 journaled to rock in a bearing 57 on the side-bar and provided at the outer side of the bar with a crank-arm 58 having an opening 59 through its free end portion. Each crank-arm 56 has secured thereto an angle-plate 60, the lower portion of which extends longitudinally of the husking-rollers and is provided on its under surface with burs or teeth, 61. The plates 60 extend centrally over the bites of the husking-rollers, as indicated. On the shaft 47 at the outer sides of the side-bars 53 are cranks 62 pivotally connected to which are longitudinally reciprocal rods 63 passing through the openings 59 of the crank-arms 58. Surrounding the rods 63 are springs 64 confined between washers 165 adjacent to cotter-pins 65 on the rods and the forward faces of the crank-arms 58. Regulation or adjustment of the tension of the springs may be accomplished, as conditions require, by the substitution or addition of washers 165 adjacent to the cotter-pins 65. The rods 63 also carry stops 66 at the rear sides of the crank-arms 58. The bearings 57 are provided with stops 157, as shown in Fig. 3, against which the crank-arms 58 rest to prevent the presser-device from contacting the rolls when it is in its innermost position.

Ears snapped from the stalks by the harvesting mechanism and elevated by the conveyer 17 are deposited thereby on to the plate 36 and distributed into the chutes 37 which direct the ears to the husking-rollers, as described. The reciprocating bar 38 tends to straighten out and advance any cross-extending ears and deflect them to extend longitudinally over the bites of the husking-rollers. In the turning of the latter, the husks and silk of the ears are withdrawn therefrom and deposited upon the conveyer 43 and discharged from the machine over the shaft 45. The teeth or pins 29 on the rollers 25 aid in causing the teeth of the rollers 24 to engage the husks and silk. It frequently happens that the husks lie so closely over the kernels as to present no projecting portions which can be grasped by the husking-rollers under the weight of the ears. To overcome this difficulty, the presser devices 54, 55 are provided to work more especially in combination with the pins or teeth 29 on the rollers 25.

In each rocking movement of the shaft 47 the rods 63 are thrust forward to press the stops 66 against the crank-arms 58, thereby forcing the plates 60 upward to permit ears of corn, as they advance down the husking rollers, to pass to the under sides of the presser-plates. In the following backward swing of the crank-arms 62 the presser-plates engage and press upon the ears, the burs or teeth 61 tending to hold the ears firmly against rotation while being acted upon by the teeth or pins 29 which tear the husks and drag portions thereof into the bites of the husking-rollers. After the plates contact with the ears, the rods 63 in their further backward movement compress the springs 64, thus producing the desired pressure maintained for a time sufficiently prolonged to insure action upon the ears of the pins 29, for the purpose stated. This same operation is repeated upon the ears as they pass beneath the lower presser-devices 55.

The construction involving the guide-chutes 37, ear-straightening or positioning bar 39, tearing rollers, and positively oscillated presser devices constructed to operate as described, are the most important features of my present improvements. Experience in the field has demonstrated that without them many ears of corn will be only partially husked or not husked at all, while with these improvements practically every ear is thoroughly husked.

The pins 29 and teeth of the rollers 24 are sufficiently shallow and blunt to have little effect in the matter of loosening the kernels. As the husked ears pass from the lower ends of the husking-rollers, they fall on to a laterally extending conveyer 67, indicated by dotted lines in Fig. 1. Any kernels loosened from the ears and dropping between the husking-rollers on to the slotted platform 44 will fall through the openings in the latter on to a chute 68 from which they drop into a pan 73. Located in the position shown in Fig. 1 is a fan-blower 69 driven by a belt 70 from a pulley 71 on a shaft 72 carrying a sprocket-pinion engaged by the chain 35. The blower discharges a blast of air through the path of kernels, etc., falling from the chute 68 into the pan 73, and sweeps out any dust and other like particles which would otherwise be deposited in the pan 73. To further insure the gripping of husks by the teeth 27 when torn by the pins 29, I have found it desirable in practice to form the rollers 25 with shallow elongated depressions, or pockets, between their rows of pins 29. The pockets on one side of each roller may be inclined as indicated at 74, while the pockets on the opposite side may extend approximately at a right angle to the length of the roller, as indicated at 75. These pockets tend to engage and bend torn or loosened parts of the husks downward into the bites of the rollers and cause them to be engaged by the teeth 27.

While I prefer to construct my improvements throughout as shown and described, they may be variously modified in the matter of details of construction without departing from the spirit of my invention as defined by the claim.

What I claim as new and desire to secure by Letters Patent is—

In a corn-husking machine, the combination with a frame provided with side-bars, of a pair of inclined and co-acting husking-rolls journaled on said frame and along which rolls the ears to be husked are moved, a bearing on one of said side-bars provided with a stop, an ear gripping and releasing presser-device over the bite of the rolls provided with a crank extending through said bearing and confined to rock freely therein, a crank-arm on said crank beyond the side-bar adapted to engage said stop, a rod engaging said crank-arm, provided with a stop at one side of the arm, a spring surrounding the rod at the other side of the arm, means on the rod for adjusting the tension of the spring, and means for oscillating said rod to press said device intermittingly into gripping engagement with the ears on the rolls to hold the ears during such engagement against movement upon the rolls, for the purpose set forth.

JAMES E. GOODHUE.

In presence of—
R. A. RAYMOND,
J. G. ANDERSON.